(12) United States Patent
Emanuel et al.

(10) Patent No.: US 7,802,397 B2
(45) Date of Patent: Sep. 28, 2010

(54) METHOD AND APPARATUS FOR TRACKING VERMIN

(75) Inventors: Henry Gideon Emanuel, Redding, CT (US); David Curtis, Redding, CT (US)

(73) Assignee: Rodotrac, Inc., Redding, CT (US)

( * ) Notice: Subject to any disclaimer, the term of this patent is extended or adjusted under 35 U.S.C. 154(b) by 857 days.

(21) Appl. No.: 10/963,127

(22) Filed: Oct. 12, 2004

(65) Prior Publication Data

US 2005/0081427 A1    Apr. 21, 2005

Related U.S. Application Data

(60) Provisional application No. 60/511,598, filed on Oct. 16, 2003.

(51) Int. Cl.
*A01M 1/20* (2006.01)
(52) U.S. Cl. ......................................... 43/131
(58) Field of Classification Search .................. None
See application file for complete search history.

(56) References Cited

U.S. PATENT DOCUMENTS

| | | | |
|---|---|---|---|
| 4,043,073 A | | 8/1977 | Basile |
| 4,093,229 A | | 6/1978 | Kelling |
| 4,103,450 A | * | 8/1978 | Whitcomb ............ 43/131 |
| 4,281,471 A | * | 8/1981 | Jenkins et al. ......... 43/131 |
| 4,541,199 A | | 9/1985 | Reidinger, Jr. |
| 4,952,401 A | * | 8/1990 | Hobbs ................. 424/405 |
| 5,833,887 A | * | 11/1998 | Byrne, Jr. ............. 252/700 |
| 6,364,499 B1 | * | 4/2002 | Jones ................... 362/109 |
| 7,089,698 B2 | * | 8/2006 | Afshari ................ 43/4.5 |
| 2004/0134114 A1 | * | 7/2004 | Afshari ................ 43/4.5 |
| 2005/0098766 A1 | * | 5/2005 | Watson et al. ......... 252/700 |

FOREIGN PATENT DOCUMENTS

| JP | 10111364 | 4/1998 |
|---|---|---|
| JP | 2002020201 | 1/2002 |

OTHER PUBLICATIONS

Tracking Mammals with Fluorescent Pigments: A New Technique, University of Nebraska, Lincoln, 1985.*
Measuring and Assessing Species Diversity III, Introduction to Mammalogy, date unknown.*
Spectronics Corporation flyer Jun. 2002 (1 page).
CIBA Data sheet Jul. 1, 2003 (9 pages).
Bayer Maxforce tick system label Oct. 2003 (1 page).
Spectronics Corporation safety data sheet Apr. 30, 2001 (3 pages).

* cited by examiner

*Primary Examiner*—Christopher P Ellis
(74) *Attorney, Agent, or Firm*—Thomas A. Gallagher

(57) ABSTRACT

A method for tracking vermin includes causing the vermin to be covered in a non-toxic fluorescent substance which will leave a trail as the rodent enters/exits the human habitation, then examining the habitation with an ultraviolet light to determine the location of the entry/exit point used by the vermin. The fluorescent substance is preferably invisible without the aid of an ultraviolet light. It is also non-toxic to humans as well as animals and is relatively inexpensive. The apparatus for applying the ultraviolet substance is preferably a "bait station" within which an attractive substance is placed and surrounded by the fluorescent substance.

15 Claims, 4 Drawing Sheets

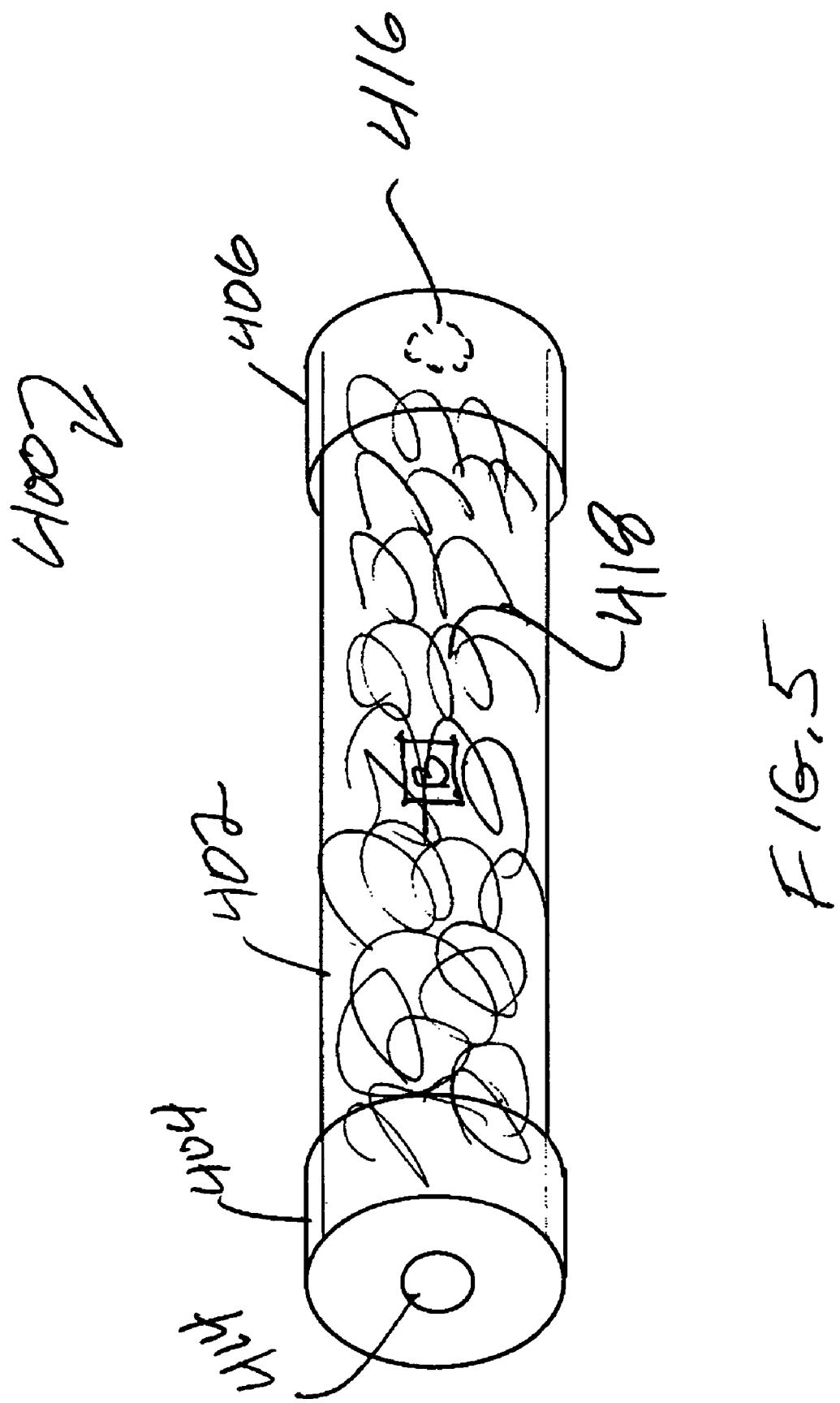

METHOD AND APPARATUS FOR TRACKING VERMIN

This application claims the benefit of provisional application Ser. No. 60/511,598 filed Oct. 16, 2003.

BACKGROUND OF THE INVENTION

1. Field of the Invention

This invention relates broadly to the removal of vermin from human habitations. More particularly, this invention relates to methods and apparatus for tracking vermin so that the vermin entry points into human habitation may be sealed.

2. State of the Art

Over the centuries, much effort has been directed to killing and/or trapping vermin so that they may be removed from human habitation. The present invention is based on the premise that it is more humane and more efficient to determine the entry point(s) of vermin to human habitation and to seal those entry points. Several criteria are important to the invention. The methods and apparatus must be safe to both humans and wildlife, including pets. The methods and apparatus must be aesthetically non-intrusive. The methods and apparatus must be easy to deploy and must be relatively inexpensive.

SUMMARY OF THE INVENTION

It is therefore an object of the invention to provide methods and apparatus for tracking vermin.

It is another object of the invention to provide methods and apparatus for tracking vermin, the methods and apparatus being safe for humans and pets.

It is a further object of the invention to provide methods and apparatus for tracking vermin which are aesthetically non-intrusive.

It is also an object of the invention to provide methods and apparatus for tracking vermin which are easy to deploy.

It is an additional object of the invention to provide methods and apparatus for tracking vermin which are relatively inexpensive.

In accord with these objects, which will be discussed in detail below, the methods of the present invention include causing the vermin to be covered in a non-toxic fluorescent substance which will leave a trail as the rodent enters/exits the human habitation, then examining the habitation with an ultraviolet light to determine the location of the entry/exit point used by the vermin. After determining the entry/exit point, it is sealed so that the vermin cannot return. The fluorescent substance is preferably invisible without the aid of an ultraviolet light. Thus, it is aesthetically non-intrusive. It is also non-toxic to humans as well as animals and is relatively inexpensive. The apparatus for applying the fluorescent substance is preferably a "bait station" within which an attractive substance is placed and surrounded by the fluorescent substance. According to the presently preferred embodiment, the fluorescent material is a powder such as UVITEX OB from Ciba Chemicals, Tarrytown, N.Y. The powder is mixed with a polyester staple fiber having a fine denier. The fiber and powder mixture is placed in the bait station which contains an attractant such as peanut butter. The bait station is dimensioned such that, in order to reach the attractant, the vermin must traverse the powder and fiber mixture, thereby covering its body with the fiber and powder mixture. A suitable bait station is based on the Maxforce Tick System from Bayer Environmental Science, Montvale, N.J. However, any container of suitable size can be used. In lieu of a fluorescent powder, a liquid or gel may be used. Moreover, in lieu of polyester fiber, feathers may be used or any material that can hold the fluorescent powder. An alternate embodiment of the invention includes a poisonous bait and the fluorescent material is used to determine whether the bait station has had activity. A kit according to the invention includes one or more bait stations containing attractant and fluorescent material and a battery powered ultraviolet light such as those available from Spectronics Corporation, Westbury, N.Y.

Additional objects and advantages of the invention will become apparent to those skilled in the art upon reference to the detailed description taken in conjunction with the provided figures.

BRIEF DESCRIPTION OF THE DRAWINGS

FIG. 5 is a transparent perspective view of a presently preferred embodiment of an apparatus according to the invention.

DETAILED DESCRIPTION OF THE PREFERRED EMBODIMENTS

Figure 1:
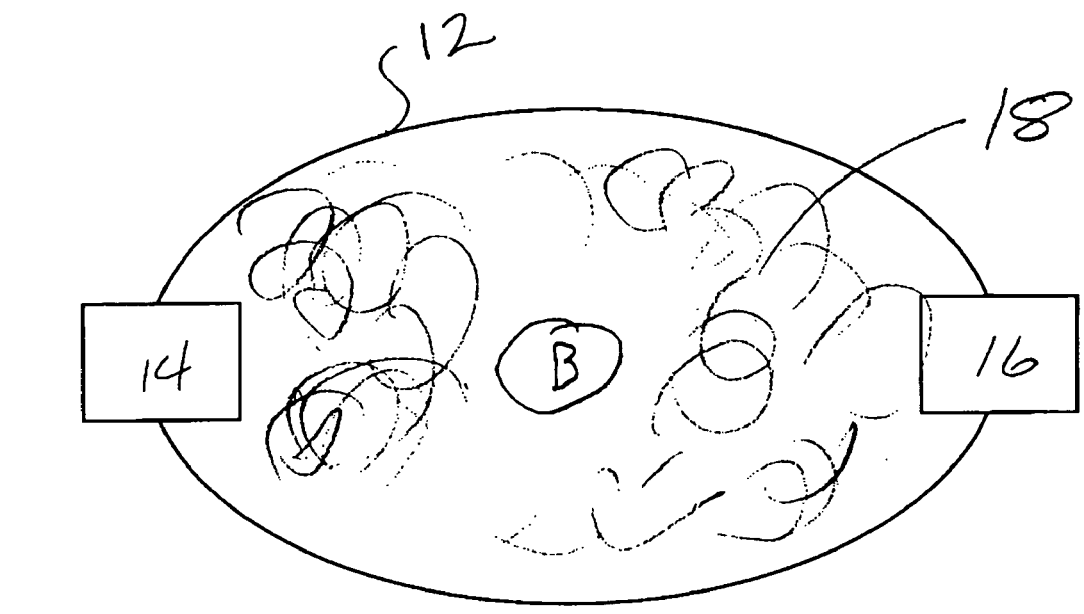
FIG. 1 is a transparent plan view of a first embodiment of an apparatus according to the invention.

Turning now to FIG. 1, an apparatus 10 according to the invention includes a plastic container 12 having an inlet 14 and an outlet 16. A quantity of bait B is centrally located within the container and is surrounded by a fine denier staple fiber 18. The fiber 18 is mixed with a fluorescent material such as fluorescent powder UVITEX OB from Ciba Chemicals, Tarrytown, N.Y. The fiber is preferably polyester or feathers or any material that can hold the fluorescent powder. The bait is preferably peanut butter mixed with sunflower seeds or a similar non-toxic attractant such as Census bait. The apparatus 10 can be made from any plastic container of suitable dimensions. The inlet 14 and outlet 16 should be dimensioned to allow vermin in and out of the container but not large enough to allow household pets or other animals into the container. The distance between the bait B and the inlet and outlet 14, 16 should be large enough so that substantially the entire body of the vermin is covered with fluorescent material. As mentioned above, the bait B is preferably non-toxic but the methods of the invention can also be used in conjunction with a poisonous vermin trap where the bait is toxic. In that case, the fluorescent material is not used to determine the entry/exit points of the vermin but is used to determine whether the poison has been placed in a location where it has been accessed by vermin.

Figure 2:
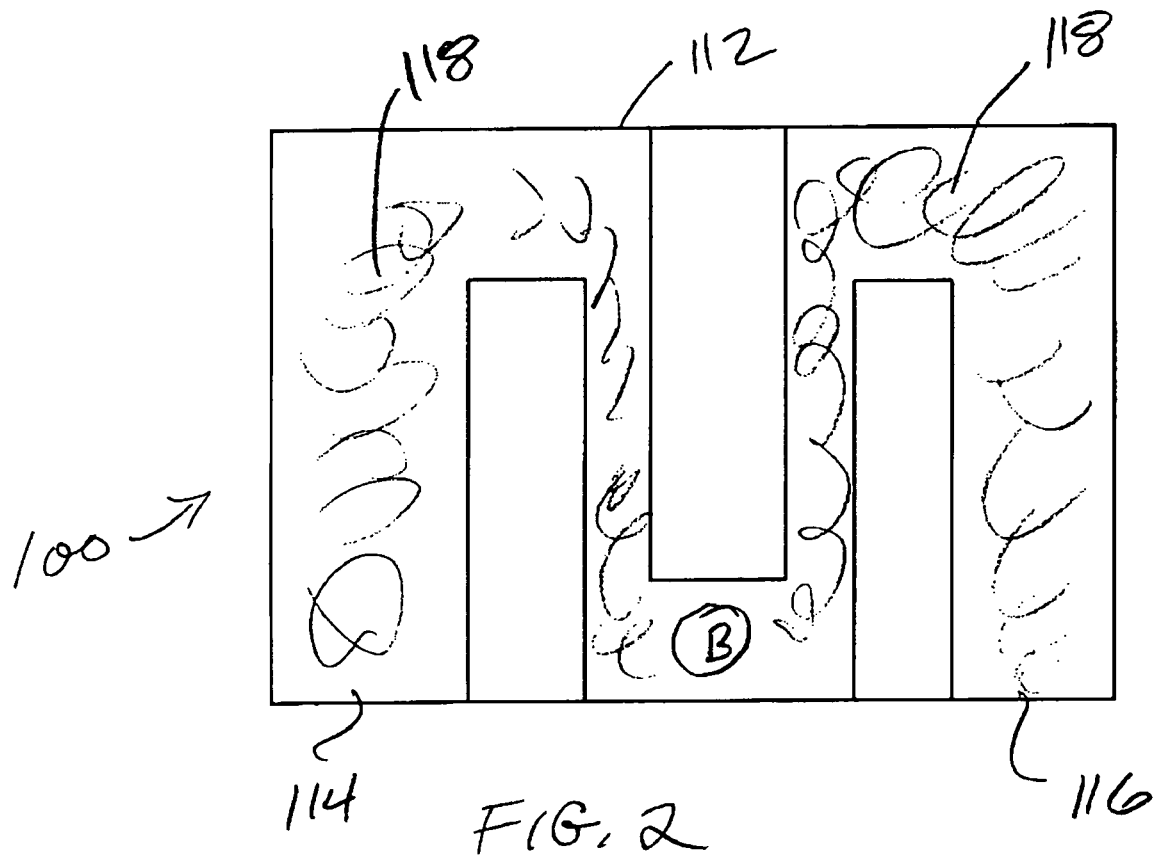
FIG. 2 is a transparent plan view of a second embodiment of an apparatus according to the invention.

FIG. 2 shows an alternate embodiment of an apparatus 100 according to the invention. The apparatus 100 includes a container 112 having an entrance 114 and an exit 116. Bait B is located midway between the entrance 114 and the exit 116. Fiber 118 mixed with a fluorescent substance is located between the bait B and the entrance 114 and the exit 116. It will be appreciated that the second embodiment 100 presents a relatively tortuous path between the entrance 114 and the bait B and the exit 116. This may facilitate covering the body of the vermin with the fluorescent substance. The apparatus 100 is similar in dimension and layout to the Maxforce Tick System from Bayer Environmental Science, Montvale, N.J. As with the first embodiment, the bait B is preferably non-toxic but the methods of the invention can also be used in conjunction with a poisonous vermin trap where the bait is toxic. In that case, the fluorescent material is not used to determine the entry/exit points of the vermin but is used to determine whether the poison has been placed in a location where it has been accessed by vermin.

Figure 3:
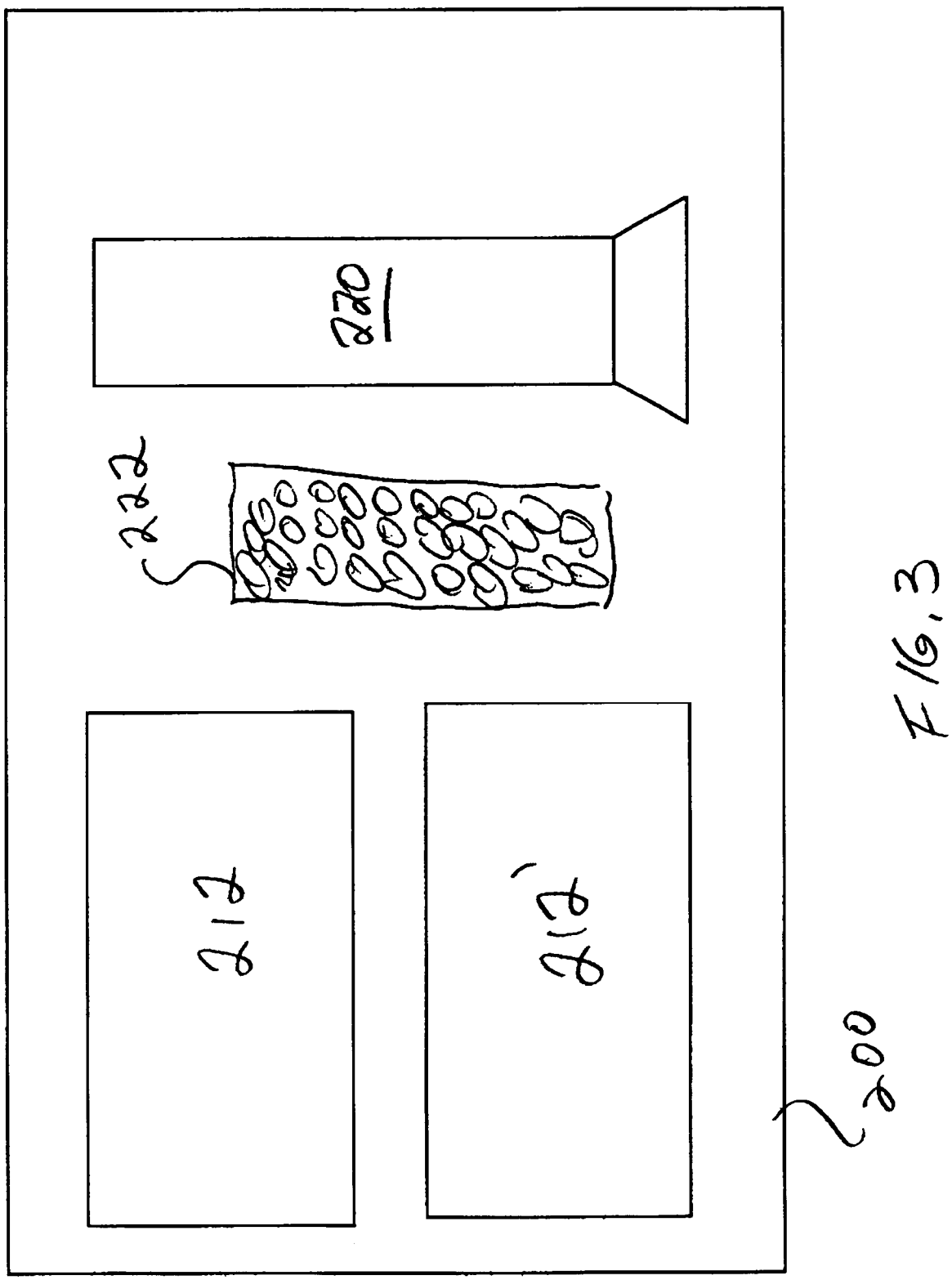
FIG. 3 illustrates a kit according to the invention.

FIG. 3 illustrates a kit 200 according to the invention. The kit 200 includes at least one container 212 (two are shown 212, 212') of the type preciously described containing bait and fluorescent material and an ultraviolet light 220, preferably battery powered such as those available from Spectronics Corporation, Westbury, N.Y., or less expensive AC powered ultraviolet lights. Optionally, the kit may also include stuffing material 222 such as copper wool (as opposed to steel wool which rusts) or hydraulic cement which can be used to fill openings where vermin enter the premises. The stuffing material may be any substance which is impervious to rust and chewing by vermin.

Figure 4:
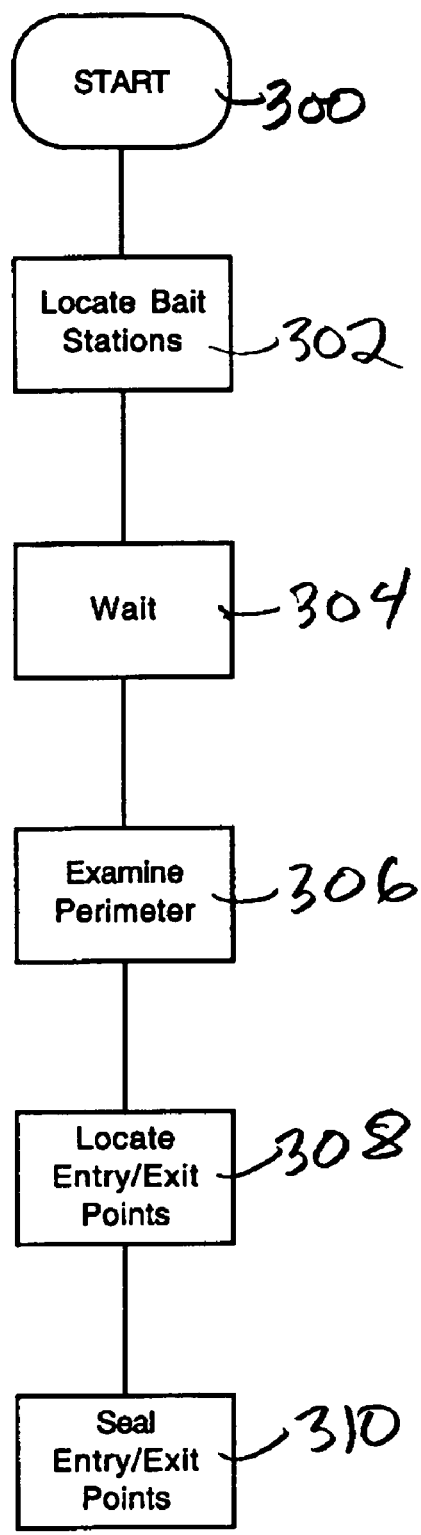
FIG. 4 is a flow chart illustrating the methods of the invention.

FIG. 4 illustrates the methods of the invention in a simplified flowchart fashion. Starting at 300, the bait stations are located at 302 in locations where vermin activity is suspected. After locating the bait stations, a wait at 304 is required to give the vermin time to access the bait stations and leave a trail of fluorescent material. A suitable wait is over night. Then, using the ultraviolet light, the perimeter of the habitation is examined at 306 to find any trace of fluorescent material. The fluorescent material is followed to determine at 308 the likely entry/exit points used by the vermin to enter/exit the human habitation. When these points are found, they are sealed at 310.

FIG. 5 illustrates the presently preferred embodiment of an apparatus 400 according to the invention. The apparatus includes a PVC pipe 402 having two end caps 404, 406. Each end cap has a hole 414, 416, approximately one inch in diameter. The pipe 402 contains polyester fiber 418 treated with fluorescent material and centrally located bait B. The one inch holes allow vermin to pass through the apparatus but prevent other small animals such as chipmunks from entering. When distributed for sale, the holes 414, 416 are covered with an adhesive strip which is easily removable prior to deployment.

There have been described and illustrated herein several embodiments of a method and apparatus for tracking vermin. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. An apparatus for tracking vermin for use with an ultraviolet light, comprising:
a container having an entry,
a non-toxic vermin attractant in said container, and
a non-toxic non-food fluorescent substance located between said entry and said vermin attractant, said fluorescent substance being visible under the ultraviolet light, wherein vermin entering the entry of the container are not trapped in the container but are free to exit the container.

2. The apparatus according to claim 1, wherein:
said fluorescent substance is a mixture of fiber and fluorescent powder.

3. The apparatus according to claim 2, wherein:
said fibers are polyester staple fibers.

4. The apparatus according to claim 2, wherein:
said fibers are feathers.

5. The apparatus according to claim 1, wherein:
said container is a pipe having two end caps, at least one end cap defining a hole.

6. The apparatus according to claim 5, wherein:
said hole is approximately one inch in diameter.

7. A kit for tracking vermin, comprising:
an ultraviolet light,
a container having an entry,
a non-toxic vermin attractant in said container, and
a non-toxic non-food fluorescent substance located between said entry and said vermin attractant, said fluorescent substance being visible under the ultraviolet light, wherein vermin entering the entry of the container are not trapped in the container but are free to exit the container.

8. The kit according to claim 7, wherein:
said fluorescent substance is a mixture of fiber and fluorescent powder.

9. The kit according to claim 8, wherein:
said fibers are polyester staple fibers.

10. The kit according to claim 8, wherein:
said fibers are feathers.

11. The kit according to claim 7, further comprising:
stuffing material for sealing the entry point of the vermin.

12. A vermin bait station, comprising:
a container having an entry,
a non-toxic vermin attractant in said container, and
a non-toxic non-food fluorescent substance located between said entry and said vermin attractant, said fluorescent substance being visible under the ultraviolet light, wherein said attractant includes a vermin poison, wherein vermin entering the entry of the container are not trapped in the container but are free to exit the container.

13. The bait station according to claim 12, wherein:
said fluorescent substance is a mixture of fiber and fluorescent powder.

14. The bait station according to claim 13, wherein:
said fibers are polyester staple fibers.

15. The bait station according to claim 13, wherein:
said fibers are feathers.

* * * * *